US008555285B2

(12) United States Patent
Sun et al.

(10) Patent No.: US 8,555,285 B2
(45) Date of Patent: Oct. 8, 2013

(54) EXECUTING A GENERAL-PURPOSE OPERATING SYSTEM AS A TASK UNDER THE CONTROL OF A REAL-TIME OPERATING SYSTEM

(75) Inventors: Zhitai Sun, Kawasaki (JP); Kenichi Hasegawa, Kawasaki (JP); Takeharu Kato, Kanagawa (JP); Toru Uchiyama, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 1570 days.

(21) Appl. No.: 10/784,944

(22) Filed: Feb. 25, 2004

(65) Prior Publication Data

US 2005/0050541 A1    Mar. 3, 2005

(30) Foreign Application Priority Data

Aug. 26, 2003 (JP) ................. 2003-301573

(51) Int. Cl.
*G06F 9/46* (2006.01)
(52) U.S. Cl.
USPC ........................... 718/103; 718/100; 718/102
(58) Field of Classification Search
USPC ............... 718/102, 103, 105, 108, 100, 104
See application file for complete search history.

(56) References Cited

U.S. PATENT DOCUMENTS

| | | | | |
|---|---|---|---|---|
| 4,435,780 A | * | 3/1984 | Herrington et al. | 710/244 |
| 4,646,287 A | * | 2/1987 | Larson et al. | 370/400 |
| 5,241,676 A | * | 8/1993 | Kubo | 718/103 |
| 5,872,962 A | * | 2/1999 | Hisanaga et al. | 712/230 |
| 5,892,959 A | * | 4/1999 | Fung | 713/323 |
| 5,944,778 A | * | 8/1999 | Takeuchi et al. | 718/100 |
| 6,108,683 A | * | 8/2000 | Kamada et al. | 718/103 |
| 6,496,848 B1 | * | 12/2002 | Nankaku | 718/100 |
| 6,631,394 B1 | * | 10/2003 | Ronkka et al. | 718/100 |
| 6,715,016 B1 | * | 3/2004 | Ohno et al. | 710/260 |
| 6,862,674 B2 | * | 3/2005 | Dice et al. | 711/170 |
| 6,996,745 B1 | * | 2/2006 | Shaylor | 714/24 |
| 2001/0016879 A1 | | 8/2001 | Sekiguchi et al. | |
| 2001/0025371 A1 | | 9/2001 | Sato et al. | |
| 2003/0037091 A1 | * | 2/2003 | Nishimura et al. | 709/103 |
| 2003/0135319 A1 | * | 7/2003 | Nishimura | 701/102 |
| 2004/0098722 A1 | * | 5/2004 | Funaki et al. | 718/103 |
| 2004/0117791 A1 | * | 6/2004 | Prasad et al. | 718/100 |

(Continued)

FOREIGN PATENT DOCUMENTS

| | | |
|---|---|---|
| JP | 5-108380 | 4/1993 |
| JP | 11-149385 A | 6/1999 |
| JP | 2000-148513 | 5/2000 |

OTHER PUBLICATIONS

Sha et al., "priority inheritance protocols" an aproach to real-time synchronization, 1990, IEEE, pp. 1175-1185.*

(Continued)

*Primary Examiner* — Abdullah Al Kawsar
*Assistant Examiner* — Caroline H Arcos
(74) *Attorney, Agent, or Firm* — Staas & Halsey LLP (57) ABSTRACT

A task control computer program includes computer executable instructions which when executed by a computer, cause the computer to execute an operating system as a task. The computer is caused to perform determining whether there is an executable non-idle process under control of the operating system and changing a set priority of the operating system task to a priority higher than the primary priority of the operating system task when it is determined that there is an executable non-idle process with the specified time elapsed.

7 Claims, 10 Drawing Sheets

(56) References Cited

U.S. PATENT DOCUMENTS

2004/0187120 A1* 9/2004 Moore et al. ............... 718/100
2004/0215932 A1* 10/2004 Burky et al. ............... 712/43
2005/0149933 A1* 7/2005 Saito et al. ............... 718/100

OTHER PUBLICATIONS

Curl Franklin, "how operating system works" howstuffworks, Apr. 4, 2003, pp. 1-3.*

(Yair Amir, "operating systems 6000.418 process control & scheduling", department of computer science the johns hopkins university, fall 2000, lecture 2, pp. 1-7).*

Leroux, "Real Time or Real Linux? A Realistic Alternative", QNX Software Systems Ltd., Aug. 8, 2003, pp. 1-13.

Japanese Patent Office Action, mailed Jan. 16, 2007, and issued in corresponding Japanese Patent Application No. 2003-301573.

* cited by examiner

STATE TRANSITION OF GENERAL-PURPOSE OS TASK, AND OPERATION RELATED TO REAL-TIME OS FOR EQUILIBRATION

| EVENT/ CONDITION | S1: INITIAL | | S1: EXECUTION IS NECESSARY (PRIMARY PRIORITY) | | S3: EXECUTION IS NECESSARY (EQUILIBRATION PRIORITY) | | S4: EXECUTION | | S5: IDLE | |
|---|---|---|---|---|---|---|---|---|---|---|
| | TRANSITION DESTINATION | OPERATION | TRANSITION DESTINATION | OPERATION | TRANSITION DESTINATION | OPERATION | TRANSITION DESTINATION | OPERATION | TRANSITION DESTINATION | OPERATION |
| E1: TASK GENERATION | S2 | · REAL PRIORITY = PRIMARY PRIORITY · DURATION TIMER = DURATION TIME-OUT VALUE, START DURATION TIMER | — | — | — | — | — | — | — | — |
| E2: TIMER INTERRUPTION | — | — | S2 | DURATION TIMER - 1 | — | — | S4 | IF EQUILIBRATION IS BEING EXECUTED, EQUILIBRATION TIMER - 1 | — | — |
| E3: DURATION TIMER == 0 | — | — | S3 | · REAL PRIORITY = EQUILIBRATION PRIORITY · EQUILIBRATION TIMER = EQUILIBRATION EXECUTION TIME | — | — | — | — | — | — |
| E4: TASK SWITCHING | — | — | S4 | STOP DURATION TIMER | S4 | OPERATE EQUILIBRATION TIMER | S2 | · REAL PRIORITY = PRIMARY PRIORITY · DURATION TIMER = DURATION TIME-OUT VALUE, START DURATION TIMER | — | — |
| E5: EQUILIBRATION TIMER == 0 | — | — | — | — | — | — | S2 | · REAL PRIORITY = PRIMARY PRIORITY · DISPATCHING | — | — |
| E6: RESOURCE WAITING | — | — | — | — | — | — | S5 | · REAL PRIORITY = PRIMARY PRIORITY · STOP EQUILIBRATION TIMER | — | — |
| E7: CANCELLATION OF RESOURCE WAITING | — | — | — | — | — | — | — | — | S2 | DURATION TIMER = DURATION TIME-OUT VALUE, START DURATION TIMER |
| E8: EQUILIBRATION REQUEST SYSTEM CALL | — | — | S3 | · REAL PRIORITY = EQUILIBRATION PRIORITY · EQUILIBRATION TIMER = EQUILIBRATION EXECUTION TIME | — | — | — | — | — | — |

FIG.11

EXECUTING A GENERAL-PURPOSE OPERATING SYSTEM AS A TASK UNDER THE CONTROL OF A REAL-TIME OPERATING SYSTEM

BACKGROUND OF THE INVENTION

1) Field of the Invention

The present invention relates to a technology for controlling a computer to execute an operating system as a task.

2) Description of the Related Art

Hybrid operating systems (OS) consisting of one Real-Time OS (hereinafter, hereinafter, "RTOS") and one General-Purpose OS (hereinafter, "GPOS") are widely used for embedded systems. Such RTOS's real time features and GPOS's plentiful application availabilities make these hybrid OSs allow real-time processing and facilitate technological developments. Further, by combining the two OSs of RTOS and GPOS, advantages of each of the two OSs can be also effectively utilized.

As an example of the hybrid OSs, there is a hybrid OS which executes its GPOS and the processes under control of the GPOS as a task (called a GPOS task) of its RTOS. The GPOS and the processes under control of the GPOS are not necessarily performed in real-time. Accordingly, the GPOS task is executed with the lowest priority and the other real-time tasks are executed with a higher priority.

Figure 11:
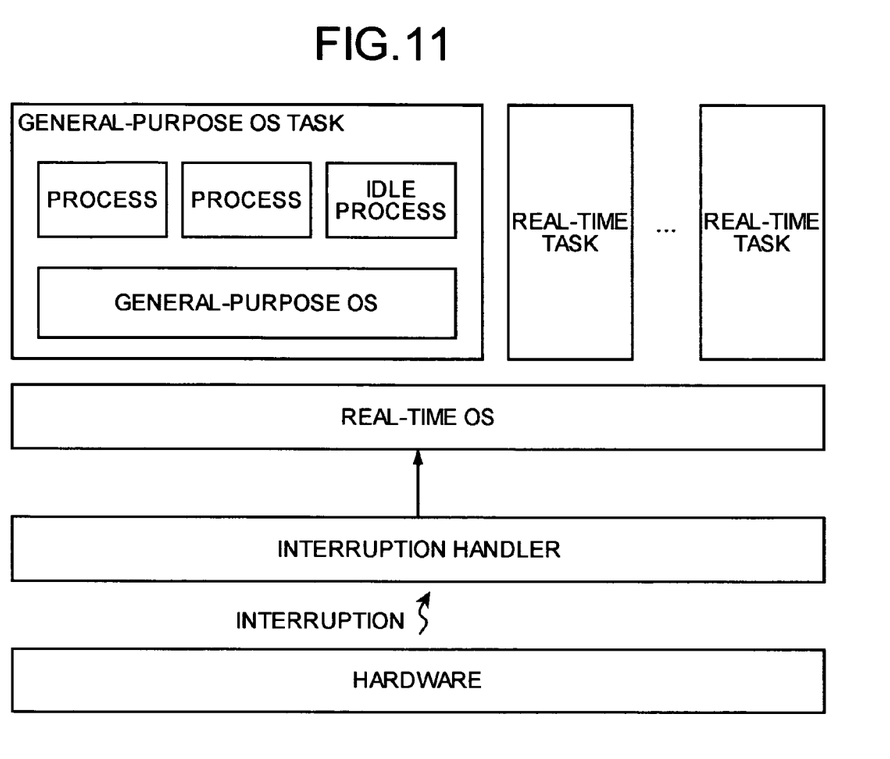
FIG. 11 is an illustration of a system composed with a hybrid OS.

FIG. 11 is an illustration of a hybrid OS. In this hybrid OS, the GPOS is executed as one of the real-time tasks under the control of the control computer program of the RTOS. That is, the GPOS including the processes under control of the GPOS is executed as a GPOS task under control of the RTOS. An example of such a GPOS is Linux.

A similar technology is also described in a Japanese Patent Application Laid Open No. 11-149385.

However, in conventional hybrid OSs, the GPOS and the processes under control of the GPOS are executed as a task having the lowest priority under control of the RTOS. That is, the execution of the processes under the control of the GPOS and the execution of the tasks under control of the RTOS are not well balanced. In other words, the processing of loads on the GPOS and the RTOS are not equilibrated.

It has been attempted conventionally to equilibrate the processes in the hybrid OS by utilizing the typical method of balancing the different tasks executed in one OS. That is, the GPOS-task's priority is raised from the lowest to higher if the GPOS-task with the lowest priority has not been executed after a predetermined period of time.

However, when such a method of equilibrating between the tasks is simply applied to the hybrid OS, since the idle process under control of the GPOS is always executable, the priority of the GPOS task is frequently raised. As a result, the GPOS task is overly executed with the raised priority and then the execution of other real-time tasks has to be delayed.

SUMMARY OF THE INVENTION

It is an object of the present invention to solve at least the problems in the conventional technology.

A task control computer program according to one aspect of the present invention causes the computer to execute an operating system as a task by determining whether there is a non-idle process in the processes to be executed under control of the operating system; and changing a set priority of the operating system task to a higher priority higher than a standard priority of the operating system task when it is determined at the determining that at least one non-idle process of the processes under control of the OS is executable.

A task control apparatus according to another aspect of the present invention, for causing a computer to execute an operating system as a task, includes a determining unit that determines whether a process of the executable processes to be executed under control of the operating system is a non-idle process; and a changing unit that changes a set priority of the operating system task to a higher priority higher than a standard priority of the operating system task when the determining unit determines that there is an executable non-idle process under control of the OS.

A task control method according to still another aspect of the present invention, for causing a computer to execute an operating system as a task, includes the steps performed by the computer according to the above aspect.

The other objects, features, and advantages of the present invention are specifically set forth in or will become apparent from the following detailed descriptions of the invention when read in conjunction with the accompanying drawings.

DETAILED DESCRIPTION

Exemplary embodiments of a method of and an apparatus for task control and a task control computer program according to the present invention will be described in detail below with reference to the accompanying drawings.

Figure 1:
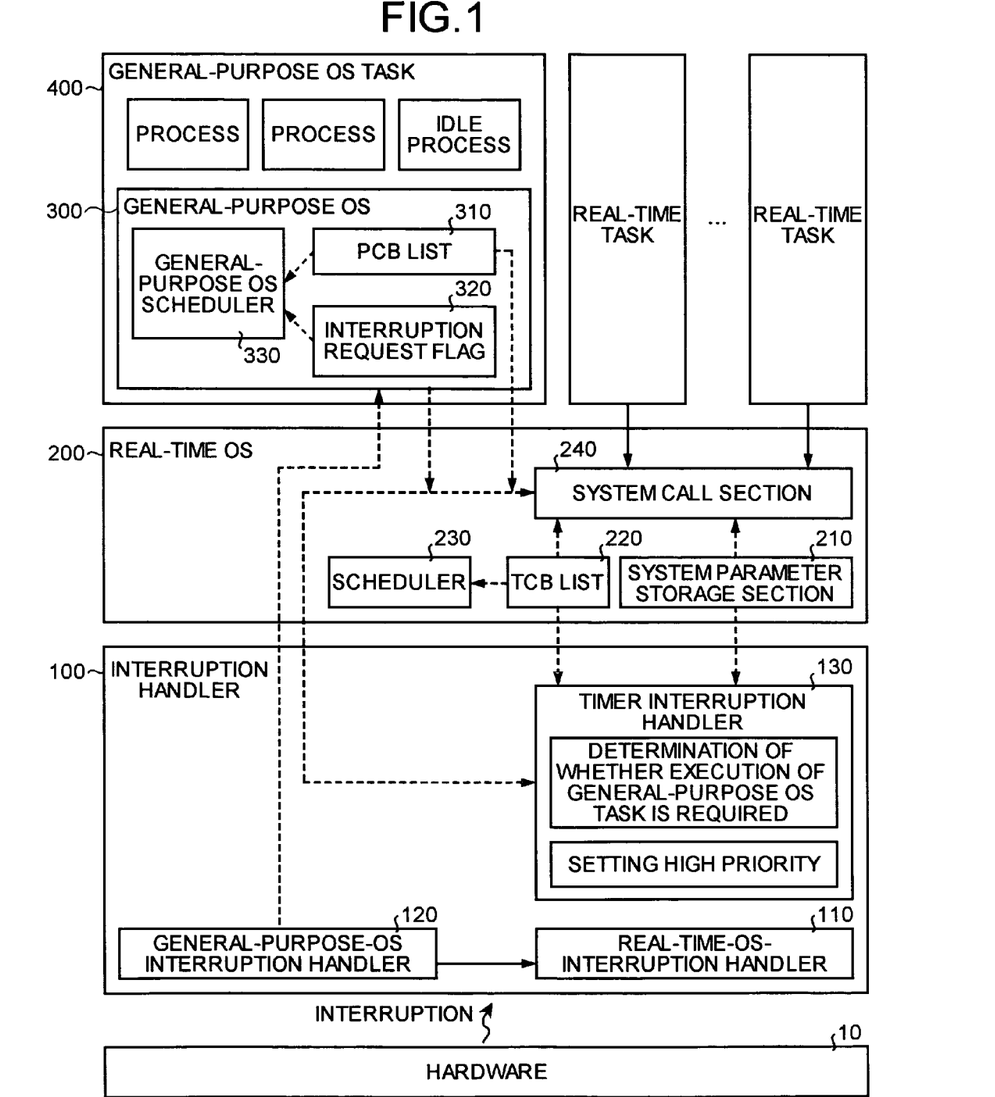
FIG. 1 is a functional block diagram of a configuration of a hybrid OS according to an embodiment of the present invention.

A hybrid OS according to the embodiment will be described below. FIG. 1 is a functional block diagram of a configuration of the hybrid OS. This hybrid OS has an interruption handler 100, an RTOS 200, and a GPOS 300. In FIG. 1, the arrowed solid lines represent the control flows, and the arrowed dotted lines represent the data access flows.

The interruption handler 100 processes interruptions which come from hardware 10. The interruption handler 100 includes an RTOS interruption handler 110, a GPOS interruption handler 120, and the system timer interruption handler 130. The interruption handler 100 is a component of the RTOS 200, although in FIG. 1, the interruption handler 100 is illustrated independently of the other components of the RTOS 200.

The RTOS interruption handler 110 processes interruptions from the hardware 10. The RTOS interruption handler 110 determines whether an interruption is directed to the RTOS 200 or to the GPOS 300. When the interruption is directed to the RTOS 200, the RTOS interruption handler 110 processes the interruption. When the interruption is directed to the GPOS 300, the RTOS interruption handler 110 hands over or passes control of the interruption to the GPOS interruption handler 120.

The GPOS interruption handler 120 processes the interruption directed to the GPOS 300. The GPOS interruption handler 120 performs only an urgent process and sets an interruption request flag 320 in the GPOS 300 to request the GPOS 300 to performing the remained process the interruption need. That is, when the interruption request flag 320 is set, the GPOS 300 processes the interruptions.

The timer interruption handler 130 processes for the system timer interruption of the RTOS. The RTOS interruption handler 110 passes control to the timer interruption handler 130 when the interruption is the timer interruption.

The timer interruption handler 130 performs a usual dispatching process and in addition determines whether processing by the GPOS task 400 is required or not. When it is determined that the processing is required, a set priority of the GPOS task 400 is raised to a higher priority.

Consequently, time for processing a load on the GPOS task 400 usually having the lowest priority is secured, and processing of loads on the RTOS 200 and the GPOS 300 can be well balanced or equilibrated between the RTOS 200 and the GPOS 300. Details of operations performed by the timer interruption handler 130 will be described later.

The RTOS 200 is an OS, which controls the GPOS 300 and several processes under control of the GPOS as one of its real-time tasks. The RTOS 200 includes a system parameter storage section 210, an executable task control block (hereinafter, "TCB") list 220, a scheduler 230, and a system call section 240.

Figure 2:
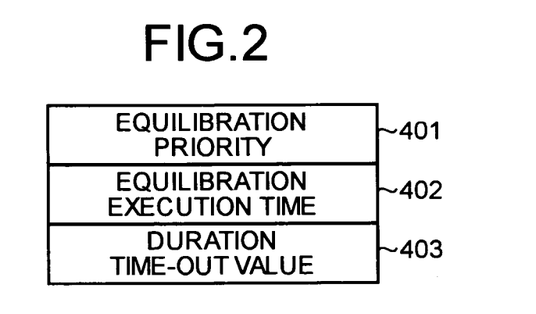
FIG. 2 is an illustration of system parameters added to an RTOS for equilibrating processing of loads between different OSs.

The system parameter storage section 210 stores the system parameters required for executing the RTOS 200. FIG. 2 is an illustration of the system parameters added to the RTOS 200 for the equilibration.

As shown in FIG. 2, the system parameters include the equilibration priority 401, the equilibration execution time 402, and the duration time-out value 403.

The equilibration priority 401, which is a priority higher than a usual priority of the GPOS task 400 is set as the set priority in the GPOS task 400 for the equilibration. That is, the set priority of the GPOS task 400 is raised to the equilibration priority 401, and thus an execution time can be secured for the GPOS task 400.

The equilibration execution time 402 is a time during which the GPOS task 400 is executed with the equilibration priority 401. The duration time-out value 403 is a time up to a point in time at which the set priority of the GPOS task 400 is actually changed to the equilibration priority 401 from a point in time at which the change is required. Since the GPOS task 400 is fundamentally given the lowest priority, even if the change to the equilibration priority 401 is required, it is not required to execute the GPOS task 400 immediately. That is, the set priority of the GPOS task 400 is raised after a time equivalent to the duration time-out value 403 has elapsed.

Figure 3:
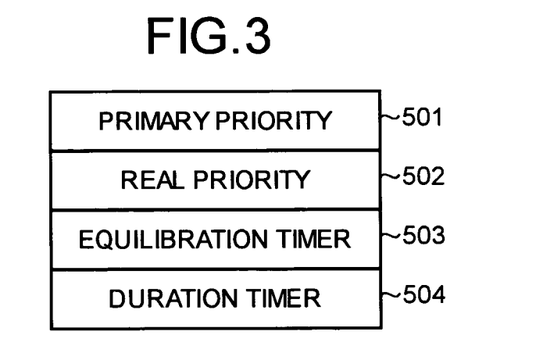
FIG. 3 is an illustration of parameters set in a task control block for the equilibration.

The executable TCB list 220 is a list of TCB and stores control information of real-time tasks. FIG. 3 is an illustration of parameters provided in each of the TCBs for the equilibration. The TCB includes a primary priority 501 representing a priority with which a task is generated, a real priority 502 with which the task is executed, an equilibration timer 503 for measuring a time during which the GPOS task 400 is executed with the equilibration priority 401, and a duration timer 504 for measuring the duration time-out value 403.

The scheduler 230 controls execution of the real-time tasks. The scheduler 230 for example changes the real priority 502 of the GPOS task 400 back to the primary priority 501, when the GPOS task 400 is executed by the equilibration and proceeds to run the idle process.

The system call section 240 processes a system call from a real-time task except the GPOS task. That is, the system call section 240 processes a request to execute the equilibration requested by the real-time task as the system call.

The GPOS 300 is an OS for controlling plural processes, and is also a part of the real-time GPOS-task 400 executed under control of the RTOS 200. The GPOS task 400 has an idle process under control of the GPOS 300. The idle process is always executable.

The GPOS 300 has an executable process control block (hereinafter, "PCB") list 310, the interruption request flag 320, and a GPOS scheduler 330. The PCB list 310 is a list of PCBs and stores control information of the processes.

The interruption request flag 320 is a flag set by the GPOS interruption handler 120 when the interruption to the GPOS 300 is required. The interruption request flag 320 is stored in a global area of the GPOS 300. The system timer interruption handler 130 refers to the interruption request flag 320.

The GPOS scheduler 330 controls the executions of the processes executed under control of the GPOS 300 by referring to information such as the executable-PCB list 310 and the interruption request flag 320.

Figure 4:
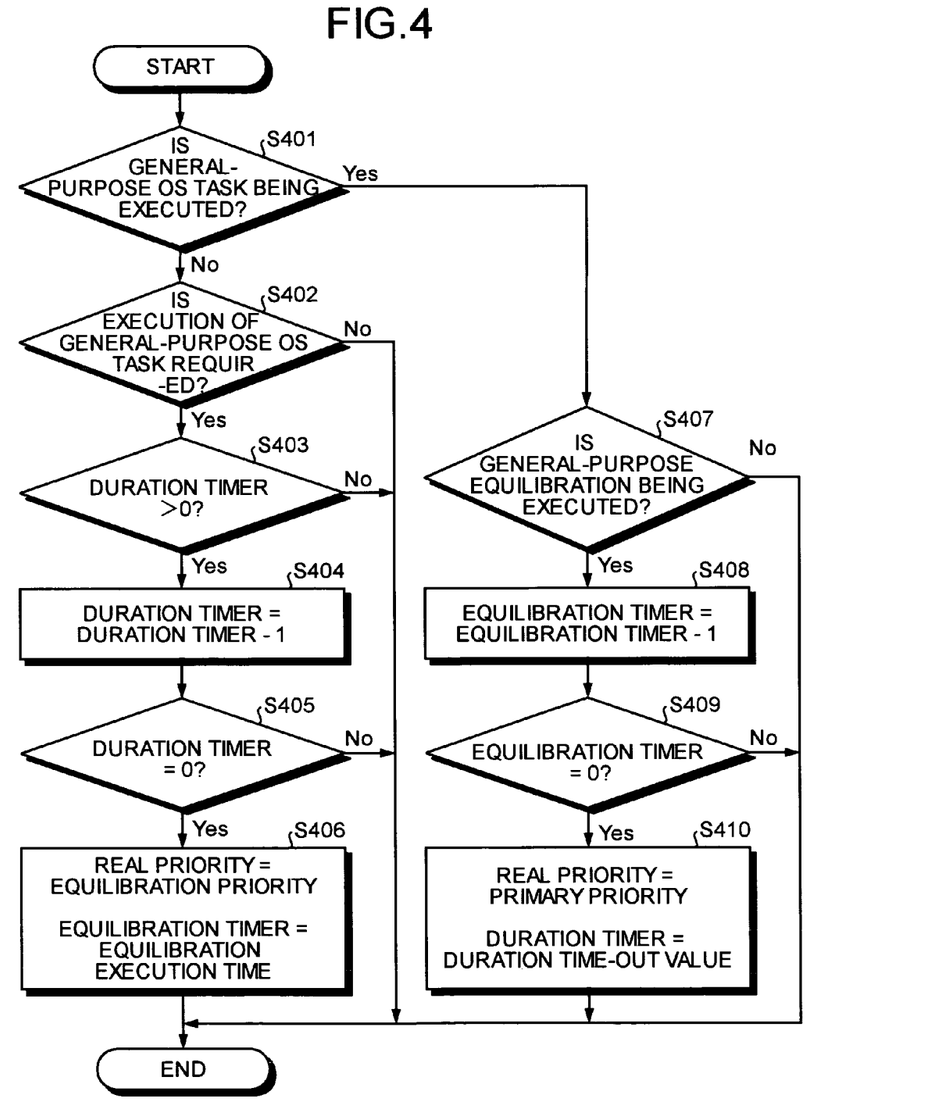
FIG. 4 is a flowchart for equilibrating the processing of loads between the different OSs executed by a timer interruption handler shown in FIG. 1.

The equilibration according to the embodiment will be described below. The equilibration performed by the timer interruption handler 130 of FIG. 1 will be described first. FIG. 4 is a flowchart of the equilibration in the system timer handler.

As shown in FIG. 4, according to the equilibration, it is determined whether the GPOS task 400 is being executed or not (step S401). If the GPOS task 400 is not being executed, it is determined whether execution of the GPOS task 400 is required or not (step S402).

If the execution of the GPOS task 400 is required, it is determined whether a value of the duration timer 504 is positive or not (step S403). If the value is positive, the duration timer 504 is under operation. The value of the duration timer 504 is thus decremented by "1" (step S404). It is then determined whether the value of the duration timer 504 is "0" or not (step S405).

If the value of the duration timer 504 is "0", the GPOS task 400 is required to be executed with the set priority raised. The real priority 502 is therefore set at the equilibration priority 401, and the equilibration execution time 402 is set in the equilibration timer 503 (step S406). The system timer interruption for the equilibration is then ended.

If the value of the duration timer 504 is not "0", it is not required to raise the set priority of the GPOS task 400 until the value becomes "0". Therefore, the system timer interruption is ended.

If the value of the duration timer 504 is not positive, it means that the set priority of the GPOS task 400 has been raised already. Therefore, the equilibration is ended. Furthermore, if the execution of the GPOS task 400 is not required, the timer interruption is ended.

If the GPOS task 400 is being executed, the real priority 502 of the GPOS task 400 is checked to determine whether the GPOS task 400 is being executed with the equilibration priority 401 or not (step S407). If the GPOS task 400 is executed with the equilibration priority 401, the value of the equilibration timer 503 is decremented by "1" (step S408). It is then determined whether the value of the equilibration timer 503 is "0" or not (step S409).

If the value of the equilibration timer 503 is "0", it means that the time during which the GPOS task 400 is executed with the equilibration priority 401 has run out. Therefore, the real priority 502 is brought back to the primary priority 501, and the duration time-out value 403 is set in the duration timer 504 (step S410).

If the value of the equilibration timer 503 is not "0", the GPOS task 400 is required to be executed with the equilibration priority 401. Therefore, the timer interruption is ended without changing the real priority 502. Further, if the GPOS task 400 is not being executed with the equilibration priority 401, the system timer interruption is also ended.

As described above, the system timer interruption handler 130 determines whether the execution of the GPOS task 400 is required or not. If the execution is required, the real priority 502 of the GPOS task 400 is raised to the equilibration priority 401 when the time equivalent to the duration time-out value 403 set in the duration timer 504 elapses. Consequently, the time for executing the GPOS task 400 can be secured. As a result, the processing of loads on the GPOS and the RTOS can be equilibrated.

In the embodiment, the value of the equilibration timer 503 is decremented by "1" if the GPOS task 400 is executed with the equilibration priority 401. However, alternately, the value of the equilibration timer 503 may be decremented by "1", when the real priority 502 of the GPOS task 400 is changed to the equilibration priority 401.

Further, the present invention has been described with the embodiment in which the value of the equilibration timer 503 is decremented by "1" every time the system timer interruption is performed to finally reach "0", i.e., the embodiment in which the GPOS task 400 uses up the equilibration execution time. According to the embodiment, the value of the equilibration timer 503 is also cleared, i.e., set at "0", when the GPOS task 400 proceeds to the idle state (running the idle process) or when an execution permission is intercepted by a real-time task having a higher priority during the execution of the GPOS task 400.

Steps of determining whether the execution of the GPOS task 400 is required or not will be described below with reference to FIGS. 5 and 6. The execution of the GPOS task 400 is required when there is an executable process other than the idle process, and also when there is a schedule request or an interruption request even though only the idle process is executable.

Therefore, it is required to obtain information related to the processes executed under-control of the GPOS 300 to determine whether the execution of the GPOS task 400 is required or not. Steps of obtaining the information will be described below with reference to FIG. 5.

Figure 5:
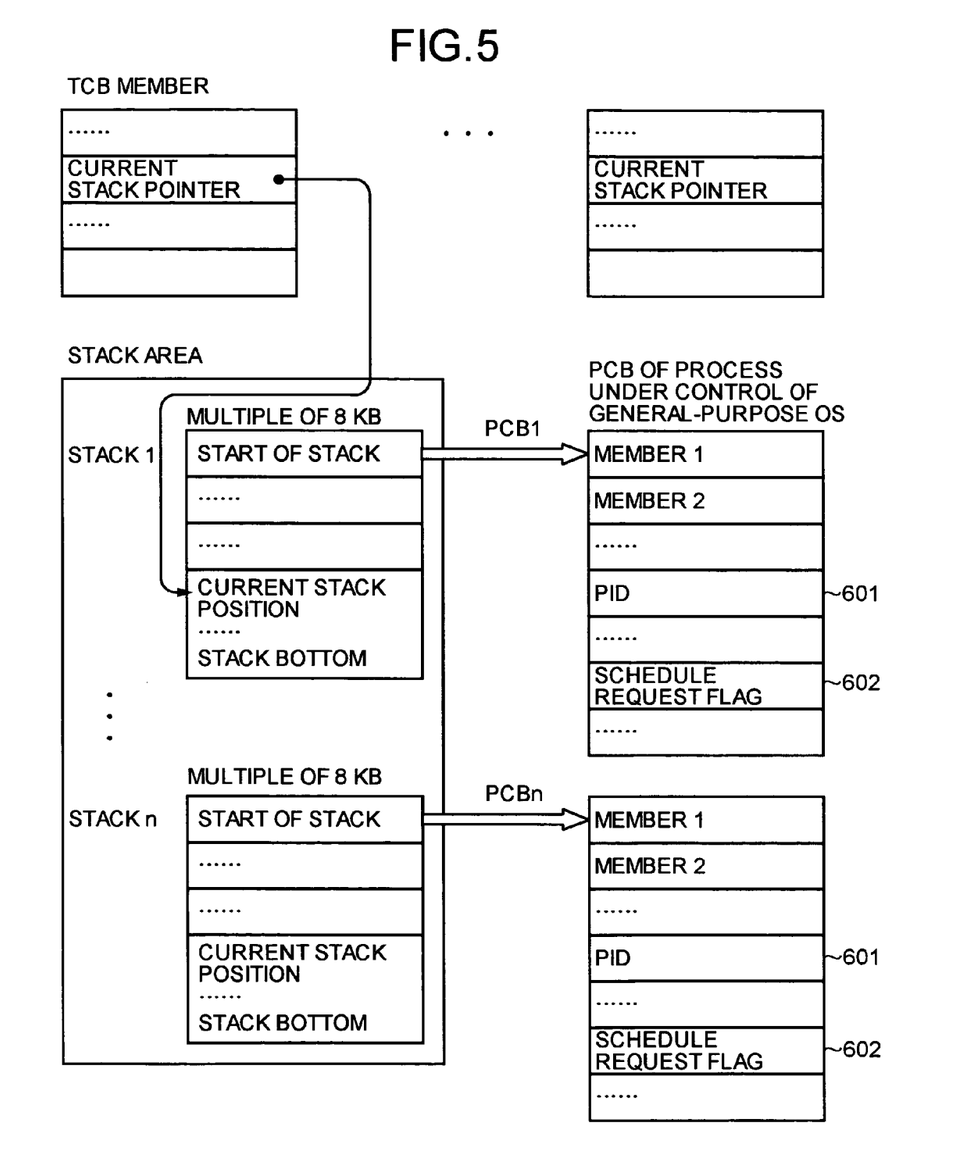
FIG. 5 is an illustration of acquiring information of processes under control of a GPOS.
Figure 6:
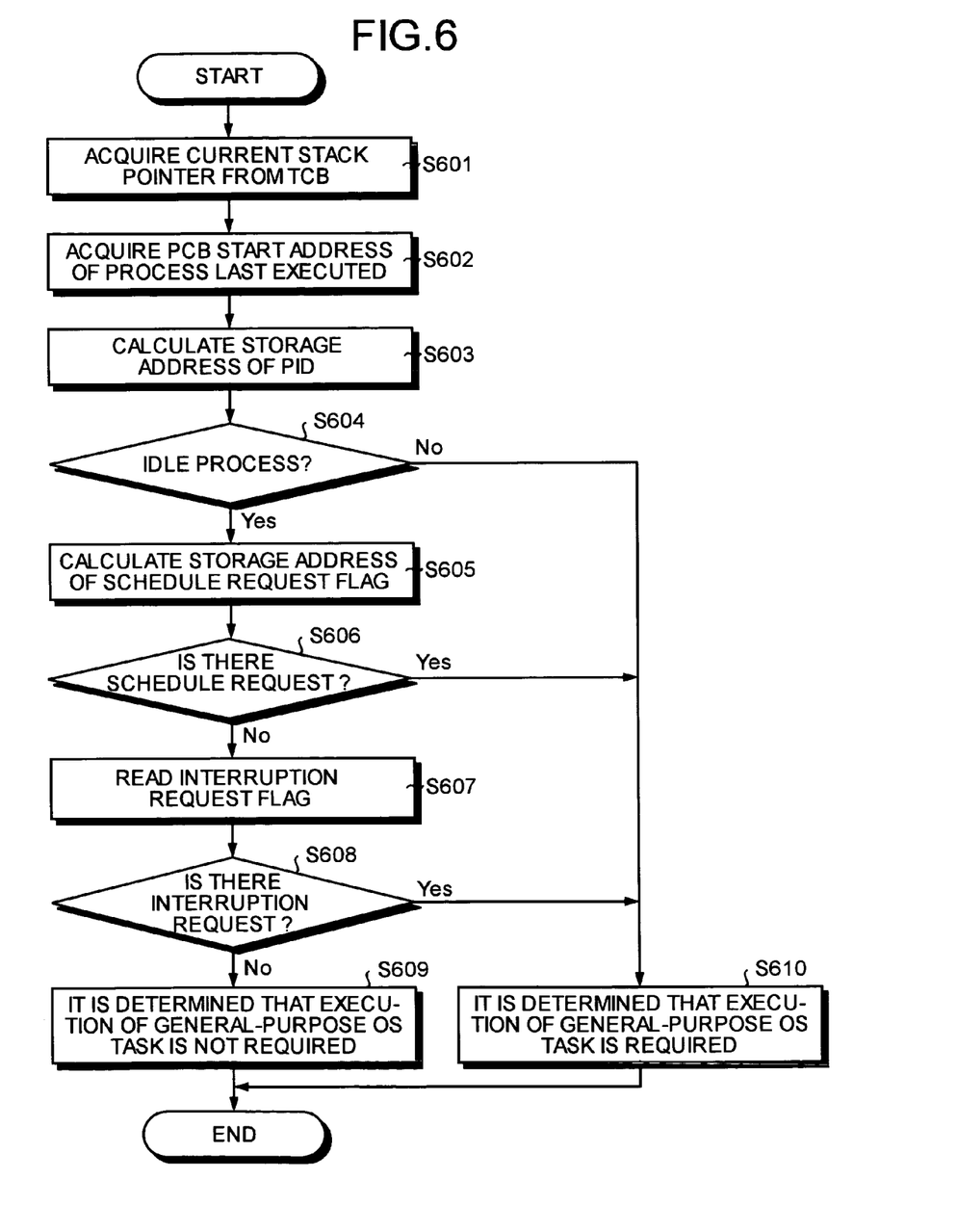
FIG. 6 is a flowchart for determining whether execution of the GPOS task is required.

As shown in FIG. 5, a current stack pointer is stored in each of the TCBs. A start address of a stack can be acquired from a value of the current stack pointer because the stacks having a same size of several kilobytes are allocated to the tasks, respectively. For example, when a stack has a size of eight kilobytes, a multiple of eight kilobytes is allocated to the start address of a stack. Therefore, the bits of the start address of a stack lower than eight-kilobyte digit must be represented by "0", and the start address can thus be identified from the value of the current stack pointer.

The start address of a PCB of a process executed under the control of the GPOS 300 is stored at a start of the stack. A process ID (hereinafter, "PID") 601 is stored in an address a predetermined value after the start address of the PCB. It can be determined whether the process is the idle process or not based on the PID 601.

A schedule request flag 602 is stored in where the PID 601 is stored with a predetermined offset. The schedule request flag 602 is set when there is a schedule request directed to the GPOS 300.

As described above, the PID 601 and the schedule request flag 602 are stored in the PCB. Accordingly, the system timer interruption handler 130 is able to determine whether the execution of the GPOS task 400 is required or not based on the PID 601 and the schedule request flag 602, as well as the interruption request flag 320 shown in FIG. 1.

Steps of determining whether the execution of the GPOS task 400 is required or not will be described below with reference to FIG. 6. The current stack pointer is first acquired from the TCB (step S601).

The start address of the stack is evaluated from the current stack pointer, and a PCB start address stored at the start of the stack is acquired (step S602). The PCB is of the process last executed.

A predetermined value is added to the PCB start address to calculate the address where the PID 601 is stored (step S603). The PID 601 is read out from the address calculated to determine whether the process is the idle process or not (step S604).

If the process is determined to be the idle process, the address of the schedule request flag 602 is calculated (step S605), and the schedule request flag 602 is read out from the address calculated to determine whether there is a schedule request or not (step S606).

If there is no schedule request, the interruption request flag 320 is read out (step S607), and it is determined whether there is the interruption request or not (step S608). If there is no interruption request, it is determined that the execution of the GPOS task is not required (step S609). When there is the interruption request, it is determined that the execution of the GPOS task is required (step S610). Moreover, if there is the schedule request, or if there is a non-idle process executable, it is determined that the execution of the GPOS task is required (step S610).

As described above, based on the PID 601 and the schedule request flag 602 stored in the PCB as well as the interruption request flag 320 stored in the global area of the GPOS 300, the timer interruption handler 130 determines whether the execution of the GPOS task 400 is required or not. Accordingly, the set priority of the GPOS task 400 may be raised only when the execution is required. As a result, unnecessary execution of the GPOS task 400 can be prevented.

Steps carried out by the scheduler 230 when the GPOS task 400 being executed by the equilibration proceeds to the idle state (running the idle process) will be described below with reference to FIG. 7.

Figure 7:
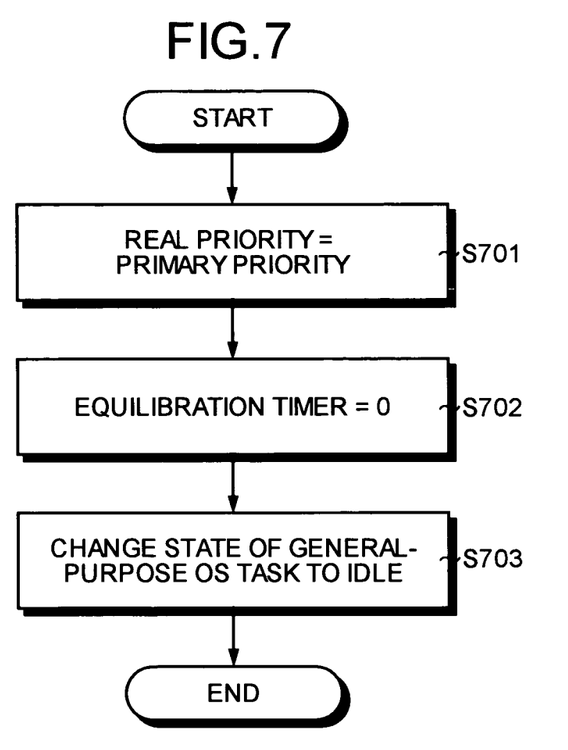
FIG. 7 is a flowchart of operations performed by the scheduler of the RTOS when the GPOS task executed by the equilibration proceeds to running an IDLE process.

As shown in FIG. 7, when the GPOS task 400 being executed by the equilibration proceeds to the idle state, the scheduler 230 stops the equilibration. Furthermore, the scheduler 230 changes the real priority 502 back to the primary priority 501 (step S701) and clears the equilibration timer 503 to "0" (step S702). A state of the GPOS task 400 is changed from the execution state to the idle state (step S703).

Steps carried out by the scheduler 230 when the execution permission of the GPOS task 400 being executed by the equilibration is intercepted by another real-time task will be described below with reference to the flowchart of FIG. 8.

Figure 8:
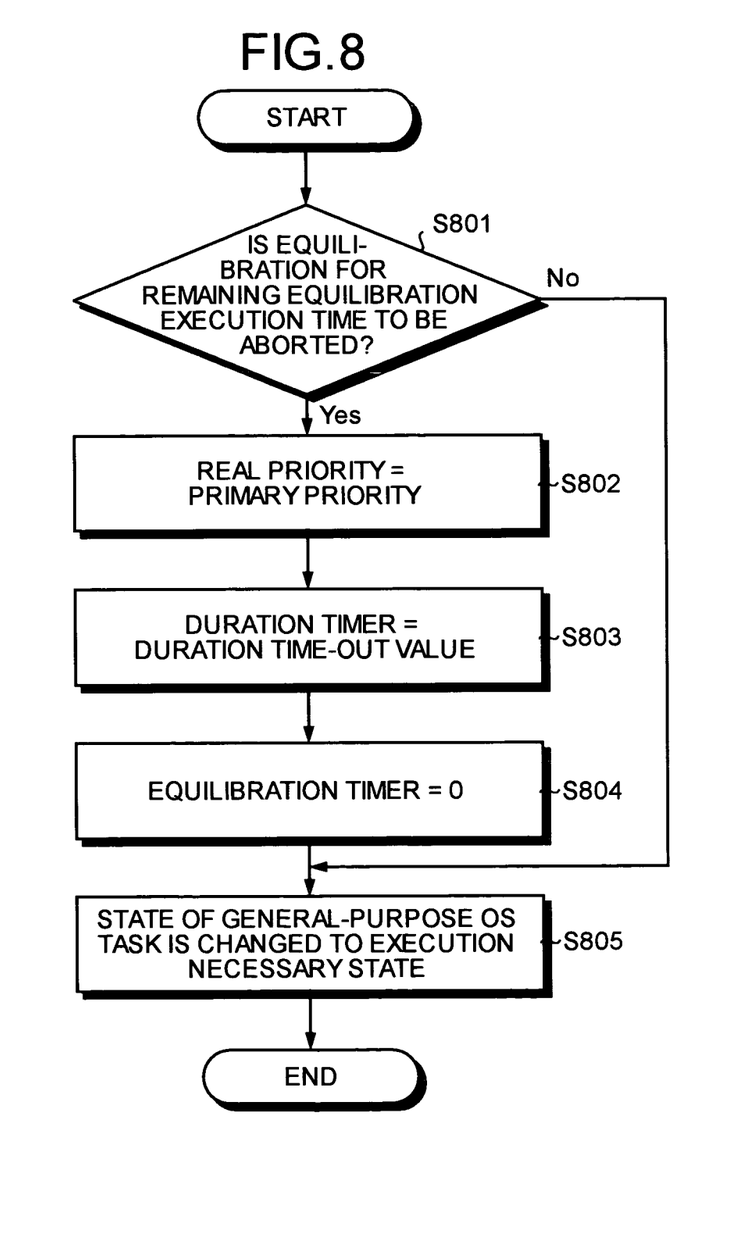
FIG. 8 is a flowchart of operations performed by the scheduler when an execution permission of the GPOS task executed by the equilibration is intercepted by a real-time task.

As shown in FIG. 8, when the execution permission of the GPOS task 400 being executed by the equilibration is intercepted by one of the other real-time tasks, the scheduler 230 determines whether the equilibration for the remaining equilibration execution time 402 is to be aborted or not (step S801). The determination on whether to abort the equilibration can be made according to any scheduling scheme.

If it is determined that the equilibration is to be aborted, the real priority 502 is changes back to the primary priority 501 (step S802), the duration time-out value 403 is set in the duration timer 504, and the duration timer 504 is started (step S803). The equilibration timer 503 is then cleared to "0" (step S804), and the state of the GPOS task 400 is changed from the execution state to the execution necessary state (step S805).

If it is determined that the equilibration is not to be aborted, the state of the GPOS task 400 is changed from the execution state to the execution necessary state without the real priority 502, the duration timer 504, and the equilibration timer 503 being changed (step S805).

Steps carried out in response to the system call section 240 of FIG. 1 requesting the equilibration will be described below with reference to a flowchart in FIG. 9.

Figure 9:
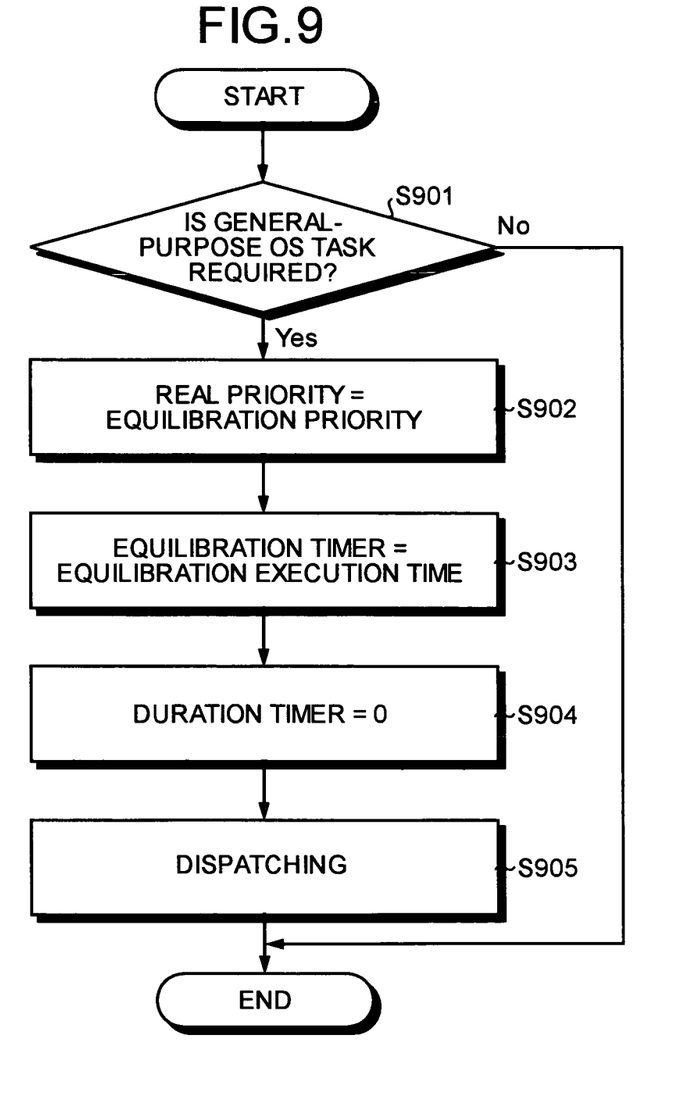
FIG. 9 is a flowchart of operations performed when the equilibration is requested by a system call section shown in FIG. 1.

As shown in FIG. 9, when the system call section 240 receives an equilibration request to equilibrate the processing of the loads on the GPOS and on the RTOS, the system call section 240 determines whether the execution of the GPOS task 400 is required or not (step S901). The determination is made according to the steps illustrated in FIG. 6.

If it is determined that the execution of the GPOS task 400 is required, the real priority 502 is raised to the equilibration priority 401 (step S902), and the equilibration execution time 402 is set in the equilibration timer 503 (step S903).

The duration timer 504 is then cleared to "0" (step S904), and dispatching is performed (S905). If the set priority of the GPOS task 400 is made highest, the GPOS task 400 is executed as a result of the dispatching. If it is determined that the execution of the GPOS task 400 is not required, the steps for the equilibration request are ended.

Figure 10:
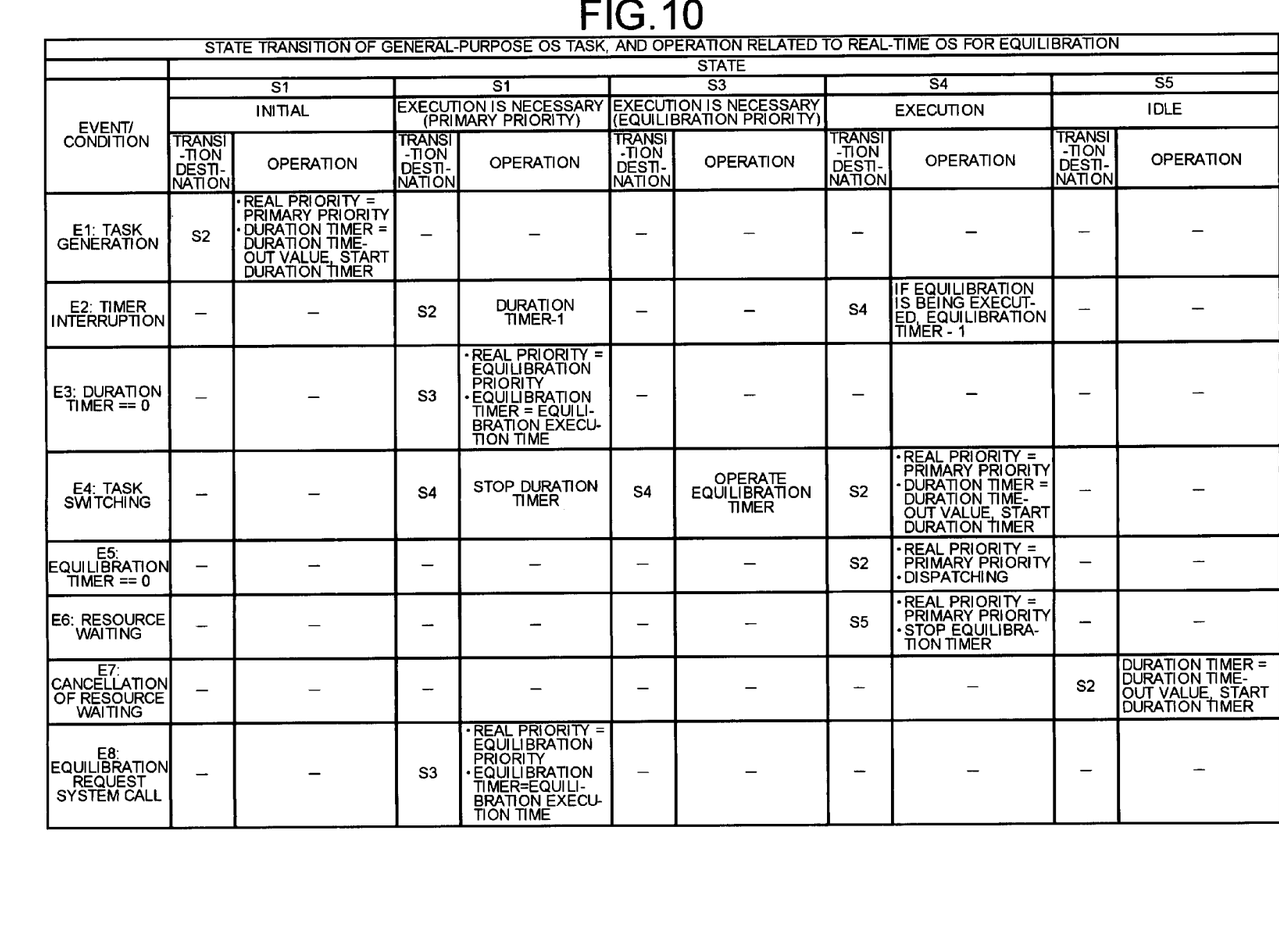
FIG. 10 is an illustration of state transition of the GPOS task related to the equilibration.

State transition of the GPOS task 400 related to the equilibration will be described below with reference to FIG. 10. As shown in FIG. 10, states of the GPOS task 400 include the initial state (S1), the execution necessary state (S2) with the set priority set at the primary priority 501, the execution necessary state (S3) in which the set priority is set at the equilibration priority 401, the execution state (S4), and the idle state (S5).

Events or conditions which cause transition of the state of the GPOS task 400 include task generation (E1), the system timer interruption (E2), elapse (E3) of duration time-out value set in the duration timer 504, task switching (E4), elapse of equilibration execution time (E5), resource waiting (E6), cancellation of resource waiting (E7), and equilibration request system call (E8).

The GPOS task 400 is in the initial state (S1) at first. When the GPOS task 400 is generated as a task under control of the RTOS, the state of the GPOS task 400 is changed to the execution necessary state (S2) with the primary priority 501. The duration time-out value 403 is set in the duration timer 504 and the duration timer 504 is started. Each time the system timer interruption (E2) occurs in the state (S2), the RTOS decreases the value of the duration timer 504 by "1". The RTOS here includes the interruption handler 100 and the RTOS 200 shown in FIG. 1.

When the value of the duration timer 504 becomes "0", the RTOS changes the real priority 502 to the equilibration priority 401, and sets the equilibration execution time 402 in the equilibration timer 503. The state of the GPOS task 400 is changed to the execution necessary state (S3) with the equilibration priority 401.

When the GPOS task 400 is in the state (S2), and the execution permission is given to the GPOS task 400 by the task switching (E4), the state of the GPOS task 400 is changed to the execution state (S4). The RTOS then stops the duration timer 504.

When the equilibration request system call (E8) is made, the RTOS changes the real priority 502 to the equilibration priority 401 and sets the equilibration execution time 402 in the equilibration timer 503. The state of the GPOS task 400 is changed to the execution necessary state (S3) with the equilibration priority 401.

If the task switching (E4) occurs when the GPOS task 400 is in the execution necessary state (S3) with the equilibration priority 401 and the execution permission is given to the GPOS task 400, the state of the GPOS task 400 is changed to the execution state (S4). The RTOS then starts the equilibration timer 503.

If the GPOS task 400 is in the execution state (S4), when the equilibration is being executed, the system timer handler decreases the value of the equilibration timer 503 by "1" each time the system timer interruption (E2) occurs.

When the value of the equilibration timer 503 becomes "0", the RTOS changes the real priority 502 back to the primary priority 501 to perform dispatching. The state of the GPOS task 400 is then changed to the execution necessary state (S2) with the primary priority 501.

When the task switching (E4) occurs in the execution state (S4), the RTOS changes the real priority 502 back to the primary priority 501, sets the duration time-out value 403 in the duration timer 504, and starts the duration timer 504. The state of the GPOS task 400 is changed to the execution necessary state (S2) with the primary priority 501.

When the resource waiting (E6) occurs in the execution state (S4), the RTOS changes the real priority 502 back to the primary priority 501 and stops the equilibration timer 503. The state of the GPOS task 400 is then changed to the idle state (S5).

When the cancellation of resource waiting (E7) occurs in the idle state (S5), the RTOS sets the duration time-out value 403 in the duration timer 504 and starts the duration timer 504. The state of the GPOS task 400 is then changed to the execution necessary state (S2) with the primary priority 501.

As described above, the RTOS changes the real priority 502 of the GPOS task 400 depending on the events occurring in the respective states of the GPOS task 400 and operates the duration timer 504 and the equilibration timer 503. As a result, the equilibration can be realized.

Further, according to the embodiment, the system timer interruption handler 130 uses the executable PCB list 310 and the interruption request flag 320 to determine the necessity of the execution of GPOS task 400. Only when the execution of the GPOS task 400 is necessary, the set priority of the GPOS task 400 is raised. As a result, unnecessary execution permission given to the GPOS task 400 can be prevented to realize the equilibration.

According to the embodiment, the GPOS task will be transited from the idle state to the execution necessary state with one of the following three conditions:

(1) A process of the non-idle processes under control of the GPOS is executable;
(2) The schedule request flag in the PCB of the idle process under control of the GPOS has been set;
(3) The interruption processing request flag of the GPOS has been set.

On the other hand, the GPOS task with a increased priority must be transited from the execution state to the idle state when all of the above three conditions are not satisfied. Thus unnecessary execution of the GPOS task can be prevented. As a result, processing of the loads on the GPOS and the RTOS can be equilibrated, and the throughput of the entire system can be increased.

The task control computer program and the task control apparatus according to the present invention are useful to computer systems using hybrid OSs and, more particularly, to a computer system or an embedded system using a hybrid OS which operates a GPOS as one of the real-time tasks.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory computer-readable recording medium that stores a task control computer program including computer executable instructions which when executed by a computer, cause the computer to execute an operation, comprising:
   executing a General-Purpose operating system as a task under control of a Real-Time operating system;
   determining whether a non-idle process is included in processes to be executed under control of the General-Purpose operating system based on a process identifier that indicates whether a process is the non-idle process or not and is stored in a process control block (PCB) of processes to be executed under control of the General-Purpose operating system, the non-idle process being a process waiting for execution under control of the General-Purpose operating system, other than an idle process executed when the General-Purpose operating system proceeds to an idle state; and
   changing a priority of the task to a higher priority by reading the higher priority stored in a storage unit as a system parameter and setting the priority of the task to the higher priority when it is determined at the determining that the processes to be executed under control of the General-Purpose operating system include the non-idle process, the higher priority being set higher than a primary priority of the task to execute the General-Purpose operating system under control of which the non-idle process is executed, and
   further changing priority of the task to the primary priority lower than the higher priority by reading the primary priority stored in the storage unit as a system parameter and setting the priority of the task to the primary priority after the General-Purpose operating system has been executed at the higher priority for a predetermined period of time, and
   wherein a system call that executes the determining and the changing is implemented.

2. The non-transitory computer-readable recording medium that stores the task control computer program according to claim 1, wherein the determining comprises:
   determining whether a schedule request for one of the processes to be executed under control of the operating system has been made to the operating system; and
   determining whether an interruption request has been made to the operating system based on an interruption request flag set when an interruption to the operating system is required.

3. The non-transitory computer-readable recording medium that stores the task control computer program according to claim 2, wherein the determining whether the schedule request has been made to the General-Purpose operating system is based on a schedule request flag stored in the process control block of one of the processes to be executed under control of the operating system.

4. The non-transitory computer-readable recording medium that stores the task control computer program according to claim 1, wherein the primary priority of the task is changed to the higher priority when a predetermined period of time has elapsed after it is determined at the determining that the non-idle process waiting for the execution is included in the processes to be executed under control of the General-Purpose operating system.

5. The non-transitory computer-readable recording medium that stores the task control computer program according to claim 1, comprising:
   wherein further changes the priority of the task to the primary priority of the task when a predetermined state of a resource is reached.

6. A task control apparatus, comprising:
   a non-transitory storage device storing computer-readable instructions, which when executed by the task control apparatus causing a computer to execute a General-Purpose operating system as a task under control of a Real-Time operating system, execution of the instructions configuring the task control apparatus to include
   a process control block (PCB) that stores a process identifier that indicates whether a process is a non-idle process or not;
   a determining unit that determines whether the process is the non-idle process or not wherein the non-idle process is executable under control of the General-Purpose operating system based on the process identifier stored in the process control block (PCB) of processes to be executed under control of the General-Purpose operating system, wherein the non-idle process is a process waiting for execution under control of the General-Purpose operating system, other than an idle process executed when the General-Purpose operating system proceeds to an idle state; and
   a changing unit that changes a priority of the task to a higher priority by reading the higher priority stored in a storage unit as a system parameter and setting the priority of the task to the higher priority when it is determined that the processes to be executed under control of the General-Purpose operating system include the non-idle process, the higher priority being set higher than a primary priority of the task to execute the General-Purpose operating system under control of which the non-idle process is executed, the task being executed under control of the Real-Time operating system, the changing unit further changes priority of the task to the primary priority lower than the higher priority by reading the primary priority stored in the storage unit as a system parameter and setting the priority of the task to the primary priority after the General-Purpose operating system has been executed at the higher priority for a predetermined period of time, and wherein a system call that executes the determining and the changing is implemented.

7. A task control method for a computer comprising:

executing a General-Purpose operating system as a task under control of a Real-Time operating system;

determining whether processes to be executed under control of the General-Purpose operating system include a non-idle process based on a process identifier stored in a process control block (PCB) of processes to be executed under control of the General-Purpose operating system, the process identifier indicating whether a process is the non-idle process or not and the non-idle process is a process waiting for execution as the task under control of the General-Purpose operating system, other than an idle process executed when the General-Purpose operating system proceeds to an idle state; and changing a priority of the task to a higher priority by reading the higher priority stored in a storage unit as a system parameter and setting the priority of the task to the higher priority when it is determined at the determining that the processes to be executed under control of the General-Purpose operating system include the non-idle process, the higher priority being set higher than a primary priority of the task to execute the General-Purpose operating system under control of which the non-idle process is executed, the task being executed under control of the Real-Time operating system; and further changing priority of the task to the primary priority lower than the higher priority by reading the primary priority stored in the storage unit as a system parameter and setting the priority of the task to the primary priority after the General-Purpose operating system has been executed at the higher priority for a predetermined period of time, and wherein a system call that executes the determining and the changing is implemented.

* * * * *